Aug. 12, 1969 L. V. GEWISS 3,461,013

METHOD AND APPARATUS FOR SANDWICHING CORRUGATED CORE BETWEEN SKIN LAYERS

Filed Dec. 11, 1963 9 Sheets-Sheet 1

Inventor

LUCIEN VICTOR GEWISS

By Lane, Aitken, Dunner & Ziems

Attorneys

Inventor
LUCIEN VICTOR GEWISS

By Lane, Aitken, Dunner & Ziems
Attorneys

Inventor

LUCIEN VICTOR GEWISS

By Lane, Aitken, Dunner & Ziems

Attorneys

Inventor
LUCIEN VICTOR GEWISS

By Lane, Aitken, Dunner & Ziems
Attorneys

Inventor
LUCIEN VICTOR GEWISS

By Lane, Aitken, Dunner & Ziems
Attorneys

Inventor
LUCIEN VICTOR GEWISS

By Lane, Aitken, Dunner & Ziems
Attorneys

Inventor
LUCIEN VICTOR GEWISS
By Lane, Aitken, Dunner & Ziems
Attorneys

Inventor
LUCIEN VICTOR GEWISS

By Lane, Aitken, Dunner & Ziems
Attorneys

Inventor
LUCIEN VICTOR GEWISS
By Lane, Aitken, Dunner & Ziems
Attorneys

United States Patent Office 3,461,013
Patented Aug. 12, 1969

3,461,013

METHOD AND APPARATUS FOR SANDWICHING CORRUGATED CORE BETWEEN SKIN LAYERS

Lucien Victor Gewiss, Ville-d'Avray, France, assignor to Marc Wood Societe Anonyme pour la Promotion des Eschanges Techniques Internationaux, Paris, France, a company of France Filed Dec. 11, 1963, Ser. No. 329,637
Claims priority, application France, Dec. 14, 1962, 918,692
Int. Cl. B31f *1/22*
U.S. Cl. 156—210 23 Claims

ABSTRACT OF THE DISCLOSURE

A method for forming a sandwich structure in which a pair of spaced skins is provided and longitudinally ruled sheet material containing spaced transverse lines of weakness is fed between said skins in a direction transverse to said lines of weakness so that said sheet material is progressively folded along successive lines of weakness with alternate ones of said lines of weakness contacting alternate ones of said skins. Apparatus for carrying out said method.

Composite materials of the so-called "sandwich" type which, in the form of slabs, are very commonly used for the manufacture of furniture, doors, partitioning, false ceilings (whether opaque, transparent or translucent), tubes and many other construction materials, do not have the rigidity, indeformability, light weight and resistance to crushing and flexure which might be expected of the material used for their central core except when the latter appears exclusively in the form of ruled surfaces solidly bonded to the inside surface of the two faces of the said materials.

So called "honeycomb" structures, as well as structures of analogous constitution such as developable or non-developable chevroned structures described in copending application Ser. No. 514,171, filed June 9, 1955, in copending application Ser. No. 256,656, filed Feb. 6, 1963, now U.S. Patent No. 3,313,080, and in copending application Ser. No. 320,752, filed Nov. 1, 1963, now U.S. Patent No. 3,351,441, are all structures with ruled surfaces.

The subject of the present invention is a new process for the constitution of sandwich materials of all forms, and more specially the constitution of cores for such materials, which is a remarkably simple technique and one that is inexpensive to apply. It also comprises, by way of novel industrial products, sandwich materials obtained from this process.

The process according to the invention consists essentially of constituting the core of the sandwich material to be manufactured by inserting side-by-side, adjacent or not, between the inside faces of the two enveloping sheets of the said material, the ruled surfaces of strips provided with alternate transverse folds, made of a pliable or non-pliable sheet material having originally, or following an appropriate mechanical or physical treatment, a sufficiently great longitudinal rigidity.

By this process, it is possible to make, in a very simple way, sandwich materials of any dimension whose faces, whether parallel or not, can be flat and can have the most diverse forms. In order to achieve this, in accordance with the invention, it suffices to arbitrarily divide the free space between the two enveloping sheets of the sandwich which are to be joined together into as many elementary spaces as desired, by means of imaginary surfaces, preferably parallel to the dominant direction of the compression forces to which the material must be subjected, and to insert within each of the elementary spaces thus defined a strip of sheet material folded in such a manner that each of its ruled flanks fits without play between the two enveloping sheets and such that the folds which compose it make firm contact with the inside faces of the said enveloping sheets so that they can be bonded to them.

Naturally, it is possible to select an appropriate stage of contraction of the strips interposed within the spaces defined as stated above such that it is possible to meet exactly the requirements imposed by the local or mean resistance which it is desired to confer on the sandwich to be manufactured by interposing, between the faces, the appropriate number of rigid, ruled flanks.

Each of the strips can be narrower than the space within which it is intended to be placed and its folds need not be straight lines. The spaces and the strips can be of varied widths. The strips can also slightly overlap laterally.

The foregoing implies in addition that the folding method selected and adapted for one folded strip can be different from that adopted for its neighboring ones.

In certain cases, the folded strips can comprise, between ruled flanks, more or less extended surfaces which follow along the inside surfaces of the enveloping sheets of the sandwich or which do not remain in contact with it.

For the constitution of tubular sandwich materials, folded strips can be rolled into right angle cross-sections of a cylinder or into a helix and more or less evenly distributed.

As can be imagined, the resistance to crushing or bending of sandwich material made by interposing folded strips, as set forth above, depends on the nature and particularly on the resistance in compression of the flanks made of the material constituting the strips. When the material is in the form of smooth surfaced sheets, it is obvious that the resistance to buckling of the flanks between folds is particularly precarious, particularly if this material is very thin, since the irregularities in its flatness or uniformity can hardly be avoided even after a prior preforming operation.

The invention contemplates, in order to overcome this possible inadequacy, the use of strips of sheet material whose longitudinal rigidity has been increased by any appropriate means such as corrugation into undulations, accordian pleats or any other profile, or even embossing, whose lines of greatest resistance have been preferably selected along a non-transverse direction. In addition the strip can be subjected before or after folding to an appropriate treatment (tempering, for example, if steel is involved).

The invention also contemplates, toward the same end, the use of materials which appear not in the form of single sheets but in the form of single or double-faced sandwich materials such as, for example, corrugated paperboard.

Naturally, the use of longitudinally reinforced materials as has just been indicated makes it possible to limit the constitution of the core flat-faced sandwich to a single folded strip, particularly if the folding can be effected obliquely with respect to the lines of greatest rigidity of the reinforced material used.

There has been described in said copending application Ser. No. 320,752 the behavior after chevron pleating of reinforced sheet materials, as has just been explained, as well as sandwich materials, and the means of easily correcting the minor imperfections which can affect this folding. These arrangements are valid for the realization of the present invention.

In every case, the folding of the strips can be effected by the usual known means, either separately, or in groups of any number of strips placed side by side.

It is often desirable that this folding be effected after a first preforming operation obtained through embossing or stretching of the strips to be formed, by using appropriate tooling, in a manner analogous to that set forth in said application Ser. No. 320,752. There is thus obtained a very substantial stiffening of the various ruled surfaces destined to be inserted between the enveloping sheets of the sandwich and, consequently, a much better resistance to buckling and to compression on the part of the strip material used. The process of preforming by stretching is valid for the various strip materials susceptible of being used, whether or not they be of smooth surface, as well as for certain longitudinally stretchable sandwich materials.

As is apparent from the foregoing, the application, side-by-side, of folder strips to constitute the cores of sandwich materials greatly simplifies their manufacture and considerably reduces their cost. The novel process covered by the present invention makes it possible not only to constitute without complication cores of sandwich materials of the most varied forms but also to produce in batch or continuous process flat sandwich slabs, with parallel or non-parallel faces, by proceeding in an extremely simple and practical manner without any tooling other than standard folding equipment.

The following supplementary description, with reference to the annexed drawings, given by way of non-restrictive examples, will bring out clearly the remarkable peculiarities of the invention and how it can be realized. In these drawings.

Figures 1, 2, 3, 4, 5, 6, 7, 8:
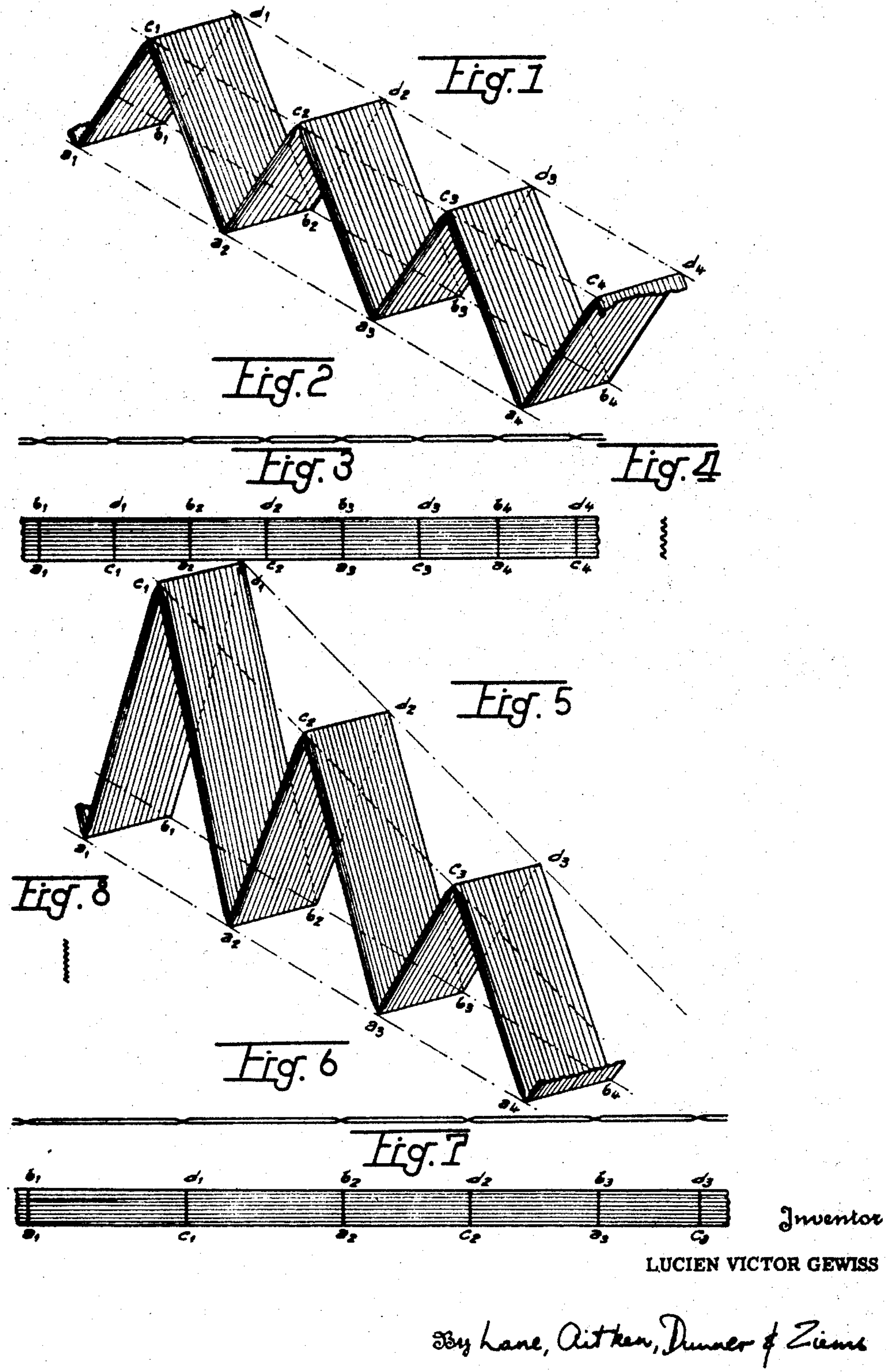
FIG. 1 represents, in perspective, a portion of a strip made from a sheet of longitudinally corrugated pliable material which has been transversely folded into regular alternate folds, which are equal and parallel, with a view toward constituting an element of a core for sandwich materials.
FIGS. 2, 3 and 4 are respectively profile, plan and end views, on a smaller scale, of the same strip as it appeared before folding.
FIGS. 5–8 are views similar to FIGS. 1–4 of a variation in the embodiment.

In the example shown in FIG. 1, there has been represented in perspective a simple method of executing a folded strip destined to constitute, in accordance with the invention, one of the core elements of a sandwich material. This strip, made from a sheet of longitudinally undulated pliable material, has been transversely folded into regular alternate folds which are equal and parallel, $a_1$, $b_1$, $c_1d_1$, $a_2b_2$, $c_2d_2$, $a_3b_3$, $c_3d_3$, etc. FIGS. 2–4 represent (on a smaller scale) respectively the elevation, plan and profile views of the strip of pliable sheet as it was before folding, but on the uneven surface of which the location of the future folds has already been marked by crushing the corrugations on either side of its median plane. It will be noted that the folds are perpendicular to the general direction of the strip and its corrugations. By this simple means, it has been possible to perform without difficulty the folding of the corrugated strip transversely to its longitudinal corrugations and the ridge folds such as $a_1b_1$, $c_1d_1$, etc. end up properly straight, parallel and equidistant.

Between the inside surfaces of the two parallel enveloping sheets of a sandwich material to be constructed, it is therefore possible to insert, side-by-side, as many strips constituted like that shown in FIG. 1 as desired. These strips can be adjacent or not. They can also be arranged parallel or not parallel to each other.

Naturally, the ridge folds of these strips will be bonded to the inside surfaces of the enveloping sheets of the sandwich at the place where they are in contact with them by any appropriate means compatible with the material of which they are made and with the material of the enveloping sheets. Generally, there will be used for this purpose the sort of products which are usually used for bonding cores to the faces of sandwich materials such as glues, cements, resins, adhesives, binders, solvents, etc., of all types. But the folds can also be bonded by welding, brazing, soldering, or by local dissolving or fusion.

As can be imagined, sandwich materials thus constituted can be particularly resistant since the flanks of material obliquely inserted between the faces are particularly rigid ruled surfaces whose resistance to buckling is, without fail, as high as the material of which they are made permits.

Fold lines executed as explained above have the advantage of collecting together in a perfectly symmetrical manner, between the inside faces of the sandwich, all of the corrugations of the flanks and, by this very fact, of permitting the forces to which these folds are subjected to disperse themselves and to distribute themselves equally throughout all the corrugations.

FIG. 5 represents, in perspective, a strip of longitudinally corrugated pliable sheet which has been folded in unequal but parallel alternate folds $a_1b_1$, $c_1d_1$, $a_2b_2$, $c_2d_2$, $a_3b_3$, $c_3d_3$, $a_4b_4$. The flanks of this folded strip are not equal, but the length of each of them is such that the ridge folds which limit them can be inscribed between two non-parallel planes.

FIGS. 6–8 represent (on a small scale) respectively the elevation, plan and profile views of the original strip of sheet on which the future folds, of unequal length but perpendicular to the general direction of the strip, have been marked as in the preceding case.

Folded strips of this type, placed parallel, side-by-side, whether adjacent or not, make it possible to produce, by the process indicated above, sandwich materials with flat, non-parallel faces having the same advantages as the foregoing ones.

Figures 9, 10, 11, 12, 21, 22, 23, 24:
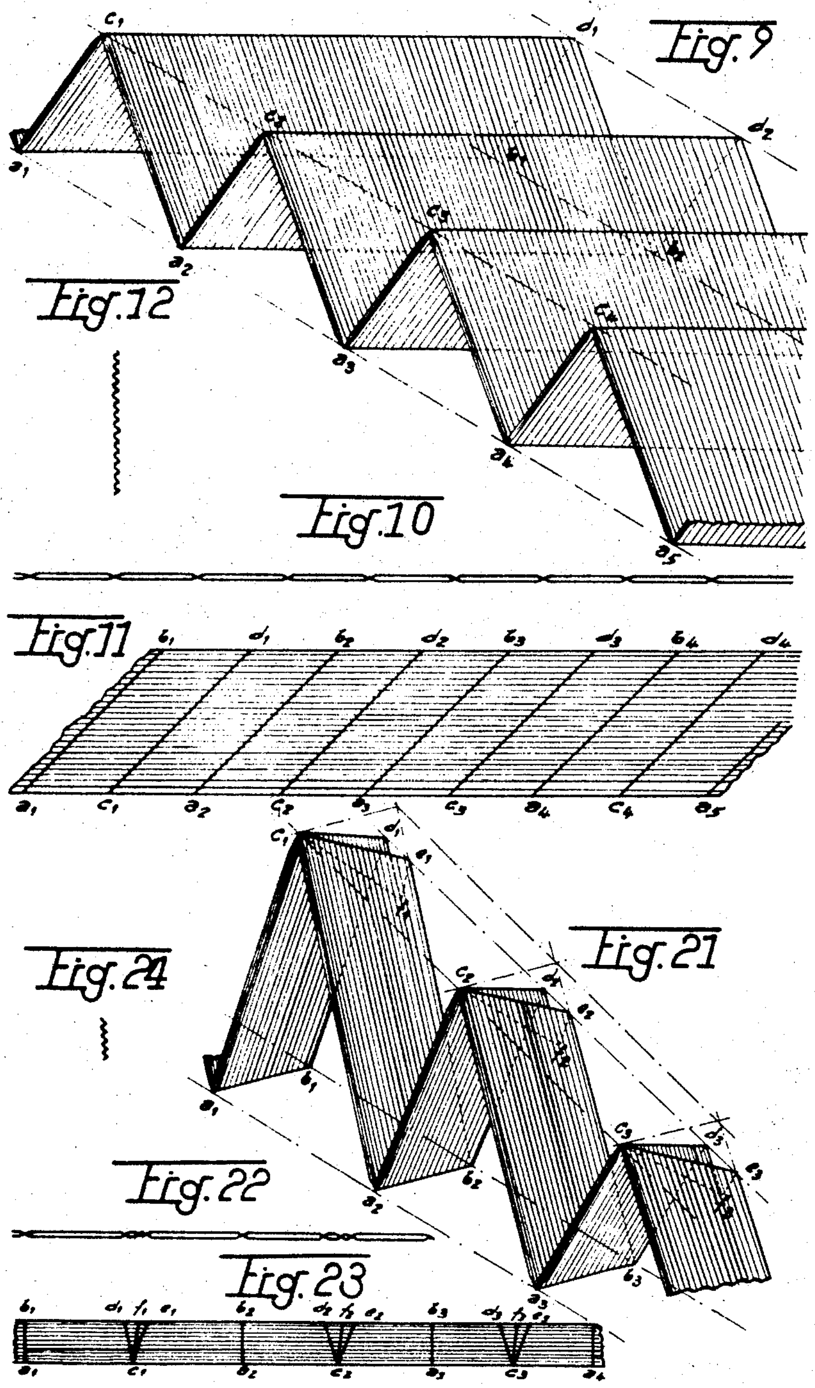
FIGS. 9–12 are views similar to the preceding ones of a second variation.
FIGS. 21–24 are similar views of a fifth variation.

FIG. 9 represents, in perspective, a relatively wide strip of longitudinally corrugated pliable sheet which has been transversely folded into regular alternate folds $a_1b_1$, $c_1d_1$, $a_2b_2$, $c_2d_2$, etc. which are equal and parallel and which are oblique with respect to the general direction of the strip. FIGS. 10–12 respectively represent, on a smaller scale, the elevation, plan and profile views of the original wide strip of corrugated sheet before folding but on whose surface has been marked the location of the future parallel folds. It should be noted that, in this case, the direction of the fold locations is oblique with respect to the longitudinal direction of the strip.

By inserting between two parallel sheets designed to form a sandwich material a single strip of material of appropirate total width or several narrower strips side-by-side, such that the various ridge folds enter into intimate contact with the inside surfaces of the two faces, and by bonding these ridge folds by the usual means mentioned above, a standwich material is obtained whose resistance is, if not increased, at least balanced in a more satisfactory way because the ridge folds are slanted. This balance can be further improved by reversing or alternating the direction in which the ridges of various folded strips placed side-by-side are slanted.

It will be explained further on how such strips can be obliquely folded and inserted close together, side-by-side, between the two faces of a sandwich, whether or not the slants of their folds are reversed or alternated.

Figures 13, 14, 15, 16, 17, 18, 19, 20:
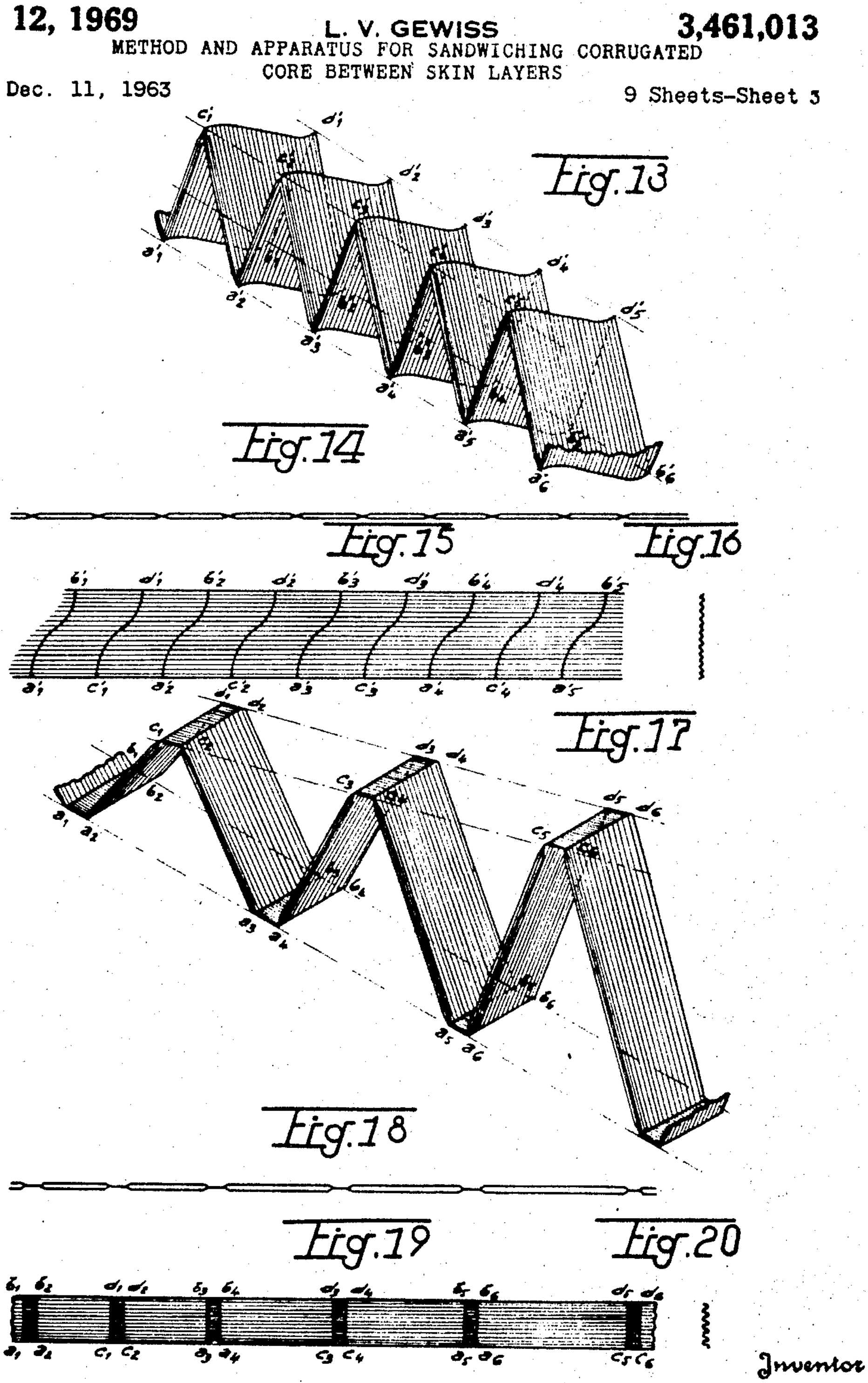
FIGS. 13–16 are similar views of a third variation.
FIGS. 17–20 are similar views of a fourth variation.

FIG. 13 represents, in perspective, a folded strip which can be obtained by folding along parallel and equidistant lines a longitudinally corrugated strip whose non-straight line folds have been previously marked on the corrugated surface. FIGS. 14–16 represent (on a reduced scale) respectively the elevation, plan and profile views of such a prepared strip before folding. After folding, regardless of the contraction of the folds, a folded strip of this type is limited by ridges $a'_1b'_1$, $c'_1d'_1$, $a'_2b'_2$, $c'_2d'_2$, etc. which are not straight lines and which, despite their form are located entirely in two parallel planes $c'_1d'_1d'_5c'_5$ and $a'_1b'_1b'_6a'_6$.

In the case where there is marked on the strip of longitudinally corrugated pliable sheet (of the type represented by the example in FIGS. 5–8) not fold lines but small fold surfaces over the entire area of which the corrugations have been crushed flat, a folded strip is obtained such has the one represented in perspective in FIG. 17, the flat strip which made this folding possible being represented, on a reduced scale, by FIGS. 18–20, which show respectively elevation, plan and profile views. The practical result of such an arrangement is analogous to that achieved by the embodiment in FIG. 5 while supplying, however, for bonding the folded strip to the inside surfaces of the enveloping sheets of the sandwich, small elementary ridge surfaces $a_1b_1b_2a_2$, $c_1d_1d_2c_2$, $a_3b_3b_4a_4$, $c_3d_3d_4c_4$, etc. instead of simple ridge lines. Because of this, assembly procedures can be used which are slightly different from the foregoing and, in particular, for metals and certain plastic materials spot or line welding can be used. In any event, the elementary bonding surfaces offer substantial additional reliability as far as bonding the ridges are concerned.

FIG. 21 represents in perspective a folded strip whose structure shows another means, different from those applied in the examples shown in FIGS. 5–8 and FIGS. 17–20, of making cores of sandwich materials with non-parallel faces. FIGS. 22–24, which represent the same strip (on a reduced scale) in elevation, plan and profile views respectively, show the location of the folds which have been previously marked on the corrugated surface of the strip before folding. In this case, folds $a_1b_1$, $a_2b_2$, $a_3b_3$, etc. are arranged as in FIGS. 5–8 but the upper folds are made in the form of hollow folds whose convex parts $c_1d_1$ and $c_1e_1$, $c_2d_2$ and $c_2e_2$, $c_3d_3$ and $c_3e_3$ are arranged so that after folding of the strip they will be in the same plane $c_1d_1e_3c_3$. The latter plane has a certain slant with respect to plane $a_1b_1b_3a_3$ which contains the lower individual ridge folds, whereas the middle concave folds $c_1f_1$, $c_2f_2$, $c_3f_3$ have been arbitrarily selected, while taking the precaution, however, of not having them interfere with the adjacent oblique flanks of the folded strip.

It can be easily imagined that in suitably determining the positions of the folds of such folded strips, it is possible to connect by means of them the two faces of a sandwich material having inside surfaces of any relative form and arrangement. Indeed, if we again take the example of FIGS. 21–24 while assuming that the upper face of the sandwich is not a plane but rather any random surface, the lower face remaining, in contrast, a plane, in order to determine the fold lines of the folded strip which will be inserted between the two faces of such a sandwich it suffices to take two parallel planes such as $a_1c_1c_3a_3$ and $b_1d_1e_3b_3$, which are assumed to be prependicular to the lower face, and to select along the four resulting lines of intersection points such as those in FIG. 21, in such a way that these points are located in groups of four in the transverse planes which will be those of the flanks of the future strip. Thus are obtained points $a_1c_1d_1b_1$, then $a_2c_1e_1b_2$, then $a_2c_2d_2b_2$, etc.

By relating all of the straight line distances between these points in the proper order onto the strip when it is flattened out, the location of the folds will be determined, which will make it possible to print them on the surface of the strip, the intermediate folds such as $c_1f_1$, $c_2f_2$, $c_3f_3$ being unimportant.

If it were necessary to determine the folds of a strip destined to be inserted not between a plane and a surface of random shaped but between two random shaped surfaces, the method of determining the location of the folds would be identical. Indeed, it would suffice to find at each of the points such as $a_1a_2a_3$ not just one corresponding point such as $b_1b_2b_3$ but two points in the same manner as has just been explained for each of the points $c_1c_2c_3$, to which the six points $d_1$, $e_1$, $d_2$, $e_2$, $d_3$, $e_3$ respectively correspond. The practical location of the folds on the surface of the flattened strip would be obtained in the same manner by relating the various distances measured between points.

Figure 25:
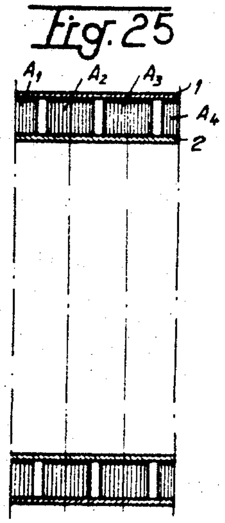
FIG. 25 is a longitudinal cross-section of tubular sandwich material whose core consists of folded strips in accordance with the invention.
Figure 27:
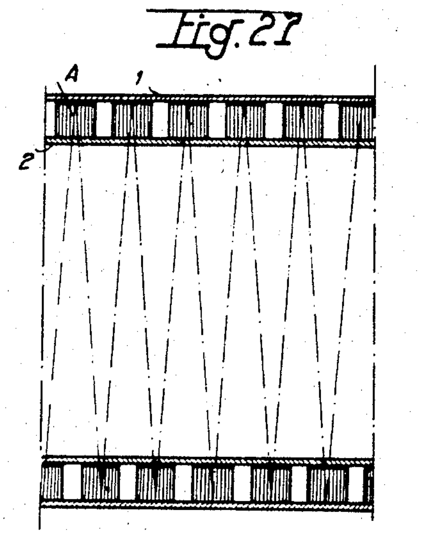
FIG. 27 is a longitudinal, axial cross-section of a variation in the embodiment of a tubular sandwich material.
Figure 26:
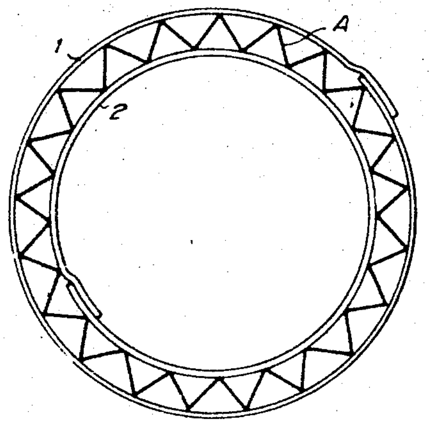
FIG. 26 is an end view of the tubular sandwich material represented in FIG. 25.

FIGS. 25 and 27 respectively represent cross-sections illustrating two slightly different methods of using a folded strip made from a sheet of corrugated material with a view toward making tubular sandwich material. FIG. 26 is an end view which shows the appearance such sandwich assumes in both cases.

In FIG. 25, various folded strips $A_1$, $A_2$, $A_3$, $A_4$ similar, for example, to that shown in FIG. 1, are rolled and arranged side-by-side along cross-sections perpendicular to the axis of the tubular sandwich to be made such that their folds are alternately in contact with the inside surface of the outside tube 1 and the outside surface of the central tube 2. In the example selected, the folds marked on the flat strip are perpendicular to its direction. They are equidistant. In this manner, after folding the folds of the strip are in contact over their entire length with the generating lines of cylinders 1 and 2, as is moreover shown by the end view in FIG. 26. The fold lines marked in the flattened strip could be directed in a slightly different direction but, in this case, the contact with the surface of the tubes would be at only one point of the folds on the central tube 2 and at two points of the folds on the outside tube 1.

In the embodiment shown in FIG. 27, the core of the tubular sandwich material consists of a single strip A rolled in a helix. In this case, the folded strip cannot be in contact with tubes 1 and 2 over the entire length of its folds except to the extent that these folds are inclined with respect to the direction of the flattened strip by an angle equal to the angle beween the helix and the generating lines of the tubes. Since the two tubes are not of the same diameter, the angles of the helices are not strictly the same and it is necessary to adopt a mean angle. Under these circumstances, the folds still locate themselves as is indicated in FIG. 27.

Materials of this type, made without bonding or attaching the folded strips which are inserted between the tubes, can be used in particular as thermal barriers to provide a very satisfactory insulation between the inside tube within which flows a high temperature fluid and the exterior of the outside tube which is immersed in a mass of liquid constantly kept at a substantially lower temperature.

FIGS. 28–29, 30–31, 32–33, 34–35, 36–37 and 38–39 are respectively elevation and plan views of the phases in the cycle of a six-stage method of mechanically producing, in a continuous process, sandwich materials with flat parallel faces by inserting between enveloping sheets a core consisting of folded strips of corrugated sheet. The various phases of the cycle show how the two constituent elements of the future material can, despite the fact that each of them progresses at a different uniform speed, end up assembled at the ridge folds of each folded strip at the end of a certain course during which they travel together.

Figures 28, 29, 30, 31:
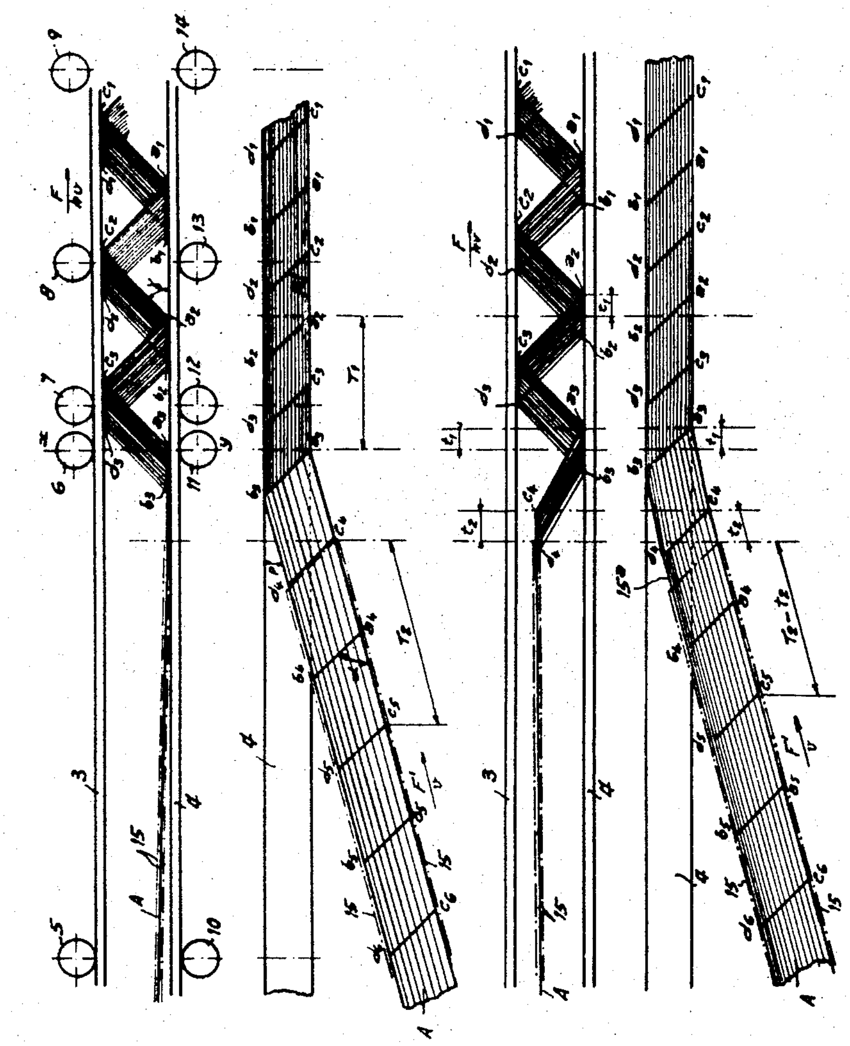
FIGS. 28 and 29 represent respectively an elevation and a plan view of an assembly illustrating the first phase of a continuous method of producing a sandwich material with flat parallel faces by incorporating between the two enveloping sheets of the material a core consisting of folded strips of the type represented in FIGS. 9–12.
FIGS. 30–31, 32–33, 34–35, 36–37 and 38–39 are similar views of the assembly illustrating succeeding phases in the production cycle of the same material.

There can be clearly seen in FIG. 28 the two outside sheets 3 and 4 of the sandwich, in profile, are parallel. In the plan view only the lower enveloping sheet 4 has been shown, the upper enveloping sheet having been removed in order to show the folds of strip A. The two enveloping sheets 3 and 4 progress from the left toward the right in the direction of the arrow F at a uniform speed $kv$. They move by rolling on cylinders 5, 6, 7, 8, 9, 10, 11, 12, 13, 14, which maintain them at the desired spacing.

Between the two enveloping sheets 3 and 4, there can be seen in profile in the elevation view, to the left of line $x$–$y$, the strip of corrugated sheet A which arrives slightly obliquely with respect to the assembly. This strip progresses from left to right in the direction of arrow F′ at a uniform speed $v$. In the plan view in FIG. 29, it can be seen that corrugated strip A progresses along a direction that makes an angle $\rho$ with the direction of enveloping sheets 3 and 4, which is equal to the difference, in the plan view, between the angle $\alpha$ of folds such as $a_4b_4$ marked on the flat strip and the angle $\beta$ of the projection of the same folds in the folded strip. The angles selected in the case shown in the figures are:

| | |
|---|---|
| $\gamma$ | 45° |
| $\alpha$ | 60° |
| $\beta$ | 45° |
| $\rho$ | 15° |

The corrugated strip A is guided during its advance inside channel 15 whose outline has been represented schematically by dot dash lines. This channel is articulated, for reasons which will be better understood from what follows below, about a pivoting axis, not shown, which is located in the median plane of the sandwich, as far as possible to the left of the assembly shown.

At the beginning of the cycle, represented by FIGS. 28–29 which show the positions of the elements of the sandwich, folds $c_1d_1$, $a_1b_1$, $c_2d_2$, $a_2b_2$, $c_3d_3$ and $a_3b_3$ have been formed. This last fold is already in contact with the inside surface of the lower enveloping sheet 4 in the sandwich.

The two folds to be formed during the following phase of the cycle are $c_4d_4$ and $a_4b_4$.

During each of these cycles, a complete double fold is formed such as $c_1d_1a_1b_1c_2d_2$.

Under these circumstances, since the formed sandwich material progresses during the cycle at a uniform speed the length of one formed fold, it covers a distance $T_1$ equal, for example, to $a_3a_2$ (FIG. 29). During the same amount of time, strip A must travel a distance $T_2$ equal to the developed length of the formed double fold, namely a distance equal to $c_5c_4$ for example. The speed of strip A being $v$, it is obvious from the figures that the speed of enveloping sheets 3 and 4 must be $kv=v$ cosine $\gamma$.

The distance travelled by enveloping sheets 3, 4 and by strip A during each complete cycle being graphically represented in FIG. 29 as indicated above by $T_1$ and $T_2$ respectively, there has been represented on the drawings by $t_1$ and $t_2$ the elementary paths travelled during each of the phases of the cycle by enveloping sheets 3, 4 and by strip A.

Thus, as can be seen in FIGS. 30 and 31, at the end of the first phase of the cycle, the enveloping sheets 3 and 4 have progressed a distance $t_1$ and strip A a distance $t_2$. Since the distance between $c_4$ and $a_3$ is always the length of one fold, strip A has had to move upward under the mechanically controlled action of channel 15, which rotates about its pivot point up to the position shown. At this point, it can be clearly seen that fold $c_4d_4$ which was hardly emerging, not yet formed, from end 15*a* of the channel during the first stage of the cycle, is now clearly formed and clear of this end of the channel since there is already between them the full distance (since it is shown developed flat and hence in true proportion) between 15*a* and $c_4d_4$. This portion of the strip being rigid in construction since the strip is longitudinally corrugated between fold marks, it maintains itself strictly in a position which would be the prolongation of channel 15.

At the end of this phase and and at the beginning of the third phase (FIGS. 32–33), a new advance $t_1$ of enveloping sheets 3 and 4 and a new advance $t_2$ of strip A have led these elements to the positions represented, in which channel 15 has moved up further an amount sufficient so that the length of strip comprised between $c_4d_4$ and $a_3b_3$ has been able to move into place in the sandwich. At this moment, the new fold in the process of being formed is almost finished. It should be noted that the location of the next fold $a_4b_4$ to be formed which is marked on the strip is, at the end of this phase, very near the end 15*a* of the channel.

Figures 32, 33, 34, 35:
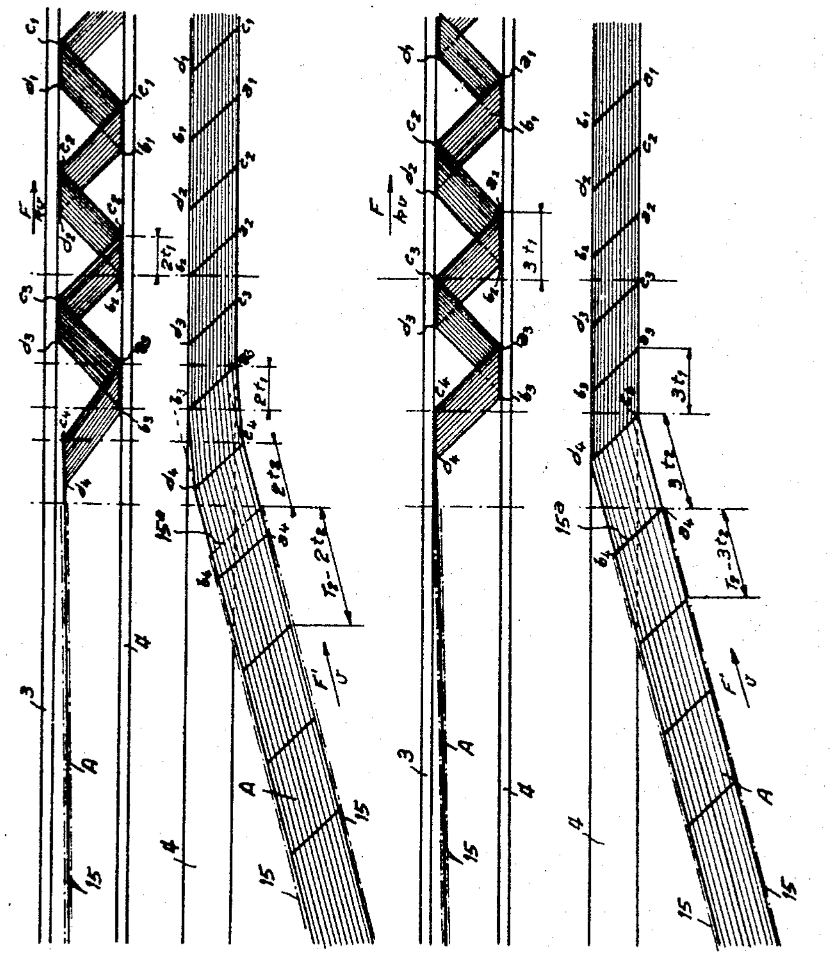

FIGS. 34–35 represent the moment when, at the end of half the cycle, the new fold $c_4d_4$ just formed has reached the inside surface of the upper enveloping sheet 3 of the sandwich. At this moment, channel 15 has pivoted to the upper limit of its movement and the next fold $a_4b_4$ to be formed has just succeeded in protruding beyond the extreme edge 15*a* of the channel.

Figures 36, 37, 38, 39:
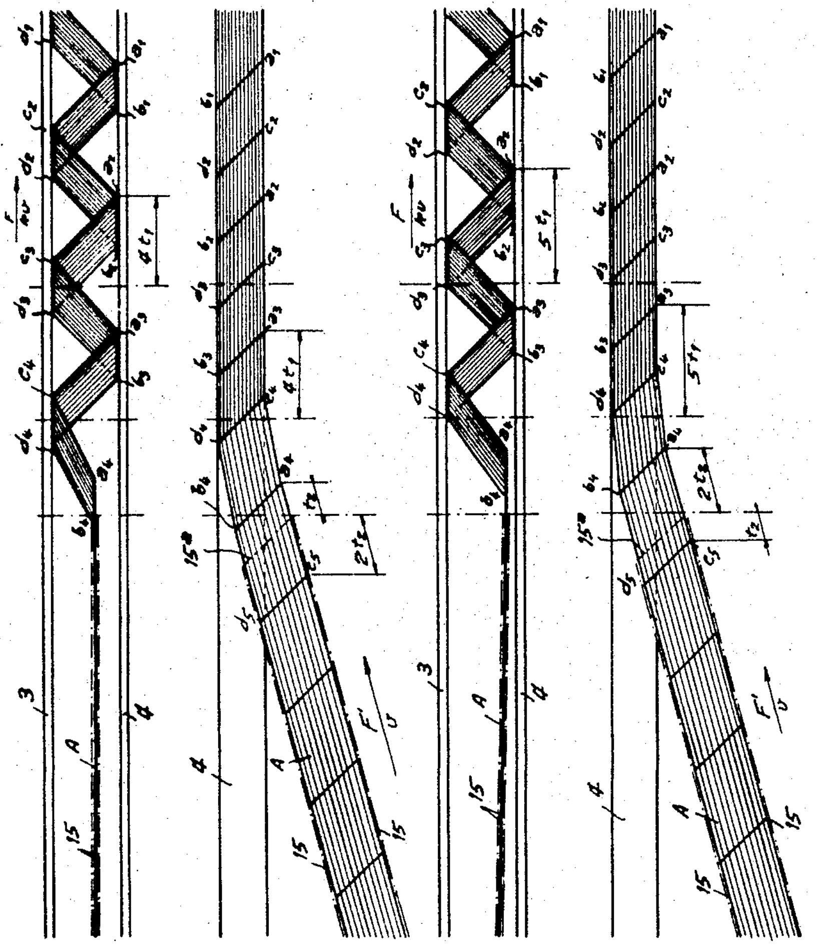

Channel 15 having, during the next phase of the cycle, begun a pivoting movement downward, the positions finally attained are those represented in FIGS. 36–37. The sandwich has travelled, since the beginning of the cycle, a distance equal to $4t_1$ whereas strip A has advanced $4t_2$, namely an additional distance of one $t_2$. Fold $a_4b_4$ is already clearly formed.

In FIGS. 38–39, the movements have further progressed and fold $a_4b_4$ is, at the end of this fifth phase of the cycle, very near the inside surface of the lower enveloping sheet 4 of the sandwich.

During the course of the last sixth of the cycle, fold $a_4b_4$ will move into intimate contact with the inside surface of lower enveloping sheet 4 and the next fold $c_5d_5$ to be formed will have just emerged from the forward edge 15*a* of the channel. The fold elements of the sandwich and the fold elements of the strip will then occupy exactly the same position shown in FIGS. 28–29 but one fold farther along, fold $a_4b_4$ occupying, at that moment, the place previously occupied by fold $a_3b_3$. The same will be true at the end of each of the following cycles.

In order to produce a sandwich during the course of the process just described of putting the folded strip in place, it is of course necessary that the inside faces of enveloping sheets 3 and 4 be progressively coated with an adhesive material designed to provide a bond between the ridge folds and the enveloping sheets and that the pressure essential for perfect contact be maintained, as long as is required by the setting time of the adhesive material used, not only by cylinders 6, 7, 8, 9, etc., but also by the respective speeds of advance of the enveloping sheets and the folded strip.

Figure 40:
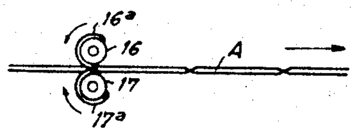
FIGS. 40 and 41 represent respectively an elevation and a plan view of an assembly illustrating a method of executing a feeding and fold-marking mechanism susceptible of being used for feeding each of the folded strips in the production process represented in FIGS. 28–39.
Figure 41:
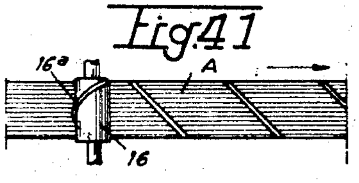
Figure 43:
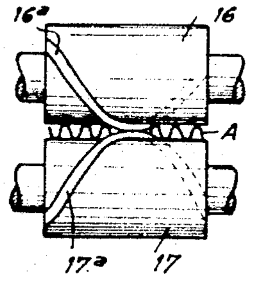
FIGS. 42 and 43 are detail views on a larger scale of the cylinders used in the assembly represented in FIGS. 40 and 41.
Figure 42:
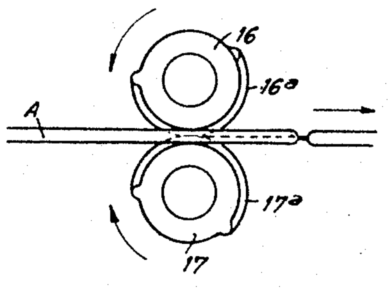

FIGS. 40 and 41 represent elevation plan views respectively of a mechanical device for feeding and marking the folds by crushing which can be advantageously used to feed, at the required linear velocity $v$, the strip of corrugated sheet A used for forming the core of the sandwich, as was set forth above with reference to FIGS. 28–39. This device essentially comprises two cylinders 16 and 17 driven in synchronization each of which contains at its periphery a crushing helix 16$a$ and 17$a$ inclined with respect to its axis by the angle which must be given to the folds marked in the corrugations of the corrugated sheet with respect to its longitudinal direction. FIGS. 42 and 43 show, on a larger scale, the design detail of these cylinders, of their crushing helices and of the strip of corrugated sheet Awhich is in the course of being marked between them.

Figure 44:
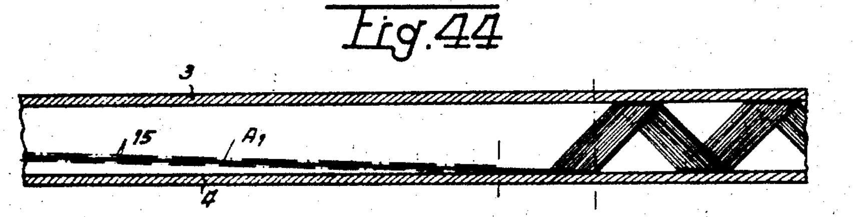
FIGS. 44 and 45 represent respectively elevation and plan views of materials utilized in a method of making sandwich material analogous to that shown in FIGS. 28–39 but simultaneously incorporating several folded strips between the enveloping sheets of the material.
Figure 45:
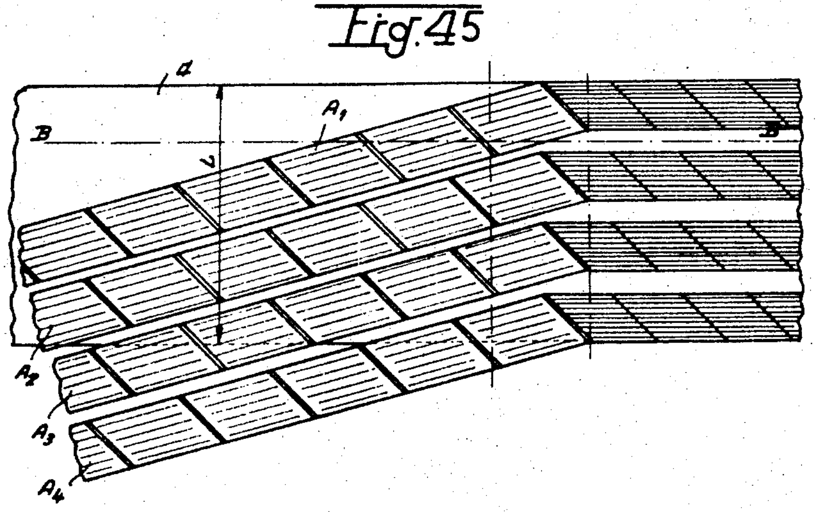

FIGS. 44 and 45 represent, respectively in cross-section along line B—B of FIG. 45 and in plan view, an assembly for making sandwich material which is derived directly from the one represented by FIGS. 28–39 but in which there are simultaneously incorporated between two enveloping sheets 3 and 4 of the sandwich, having here a width L, not just one but several strips $A_1$, $A_2$, $A_3$, $A_4$ of corrugated sheets which are marked, inserted and folded in place side-by-side. In this case, channel 15 is provided with as many parallel passages as there are individual strips to be incorporated in the sandwich. The mechanical device which feeds the strips and crushes them at the locations of the folds can be similar to that represented in FIGS. 40–43, the longer cylinders 16 and 17 being, however, equipped from one end to the other with as many suitably disposed crushing helices as there are strips to be marked and to be fed.

Figure 46:
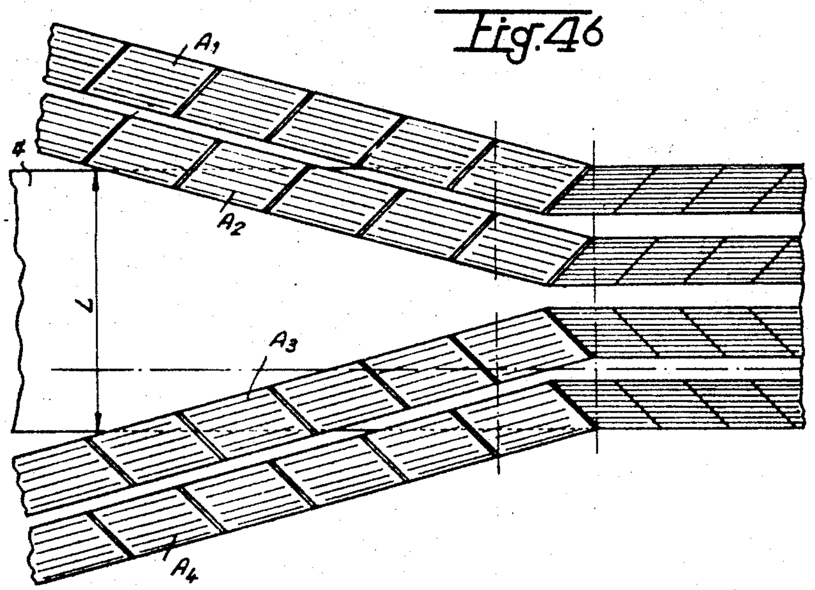
FIG. 46 is a plan view of the materials utilized in a variation in the execution comprising the simultaneous installation of two series of folded strips brought from two different symmetrical directions.

FIG. 46 represents a plan view of an assembly for making sandwich material which is very similar to the foregoing one but which is arranged so as to place side-by-side strips which are not all folded in the same direction at a certain angle but two sets of strips folded in two different directions at symmetrical angles. In this particular case, the channel for distributing the strips comprises two sets of parallel passages one of which is along a certain oblique direction and the other of which is along an oblique direction symmetrical to the foregoing one with respect to the axis of movement of the enveloping sheets. Naturally, an arrangement of this type requires the use of a separate mechanical strip feeding and crushing device for each of the two sets of strips.

The last two examples described make it apparent that it is possible to combine strips by alternating or opposing the angles of their ridge folds in as varied a manner as is necessary for balancing the reactions under load which might be caused by the oblique flanks of the cores of sandwich materials made according to the invention.

Figures 47, 48, 49:
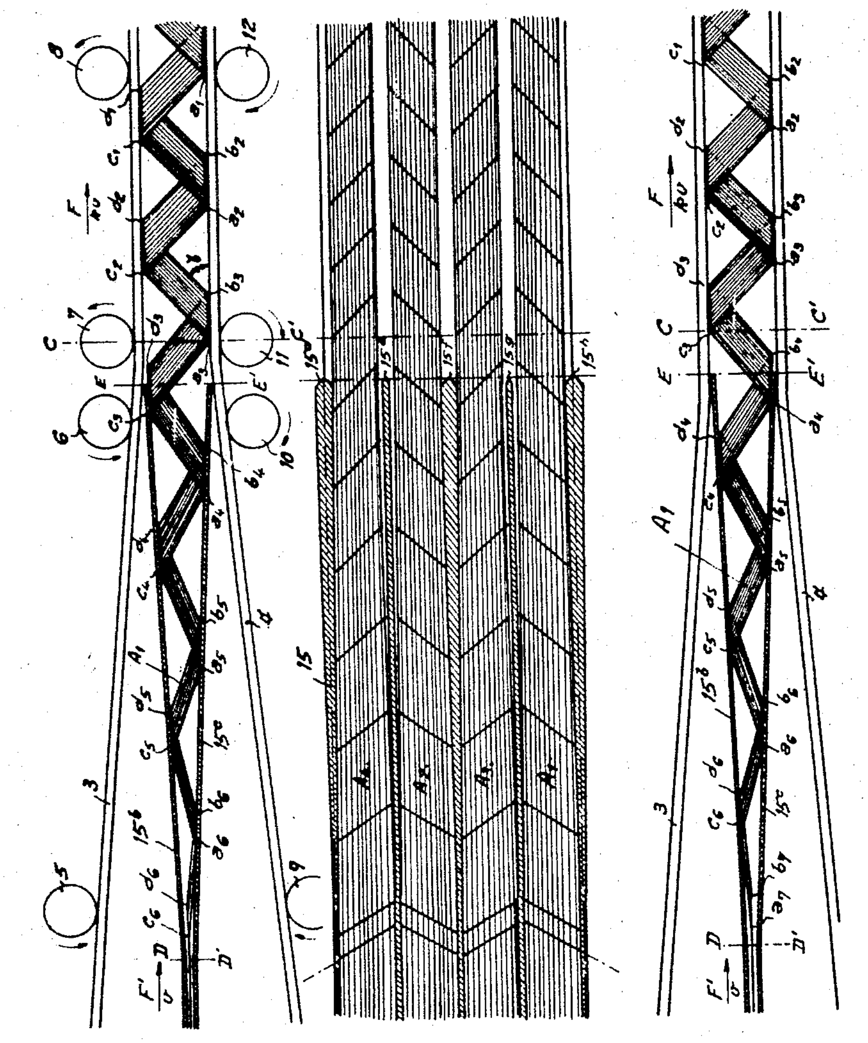
FIGS. 47 and 48 represent respectively an elevation and a plan view of an assembly illustrating another method of making sandwich materials by means of a continuous process.
FIG. 49 is a view similar to FIG. 47 representing the material at another stage in the advance of the folded strip.

FIGS. 47 and 48 represent elevation and plan views respectively of another assembly for the continuous production of sandwich materials which is slightly different from the foregoing ones in that it uses a channel for inserting the strips of corrugated sheet which is not movable. There can be seen in FIG. 47, in which the side 15$h$ of the channel has been removed to show the strips, the two enveloping sheets 3 and 4 of the future sandwich. These sheets advance between rollers 5, 6, 7, 8, 9, 10, 11, 12 at a speed $kv$ as in the case of FIG. 28, but obliquely, at least up to plane CC′. From this point on, enveloping sheets 3 and 4 are maintained parallel to each other during their movement from left to right.

In this embodiment, as can be seen in the plan view in FIG. 48, it has been assumed that it was desired to insert between enveloping sheets 3 and 4 four parallel strips $A_1$, $A_3$, $A_2$, $A_4$, marked with folds alternately slanted in opposite directions by means of a device similar to that described with reference to FIGS. 40–43. Strip $A_1$ represented in FIG. 47 corresponds to the one designated by the same reference in FIG. 48. It behaves otherwise exactly in the same manner as strip $A_2$.

At the left of FIG. 47, it can be seen that strip $A_1$ appears between the two walls 15$b$ and 15$c$ of channel 15, which are parallel up to plane DD′. Between planes DD′ and EE′, the two walls 15$b$ and 15$c$ of the channel progressively diverge from each other. To the right of plane EE′, the spread of the said walls attain the maximum permitted by the two enveloping sheets 3 and 4 of the sandwich.

In the plan view in FIG. 48, channel 15 appears to be the combination of four separate channels arranged so as to guide in a parallel direction the four strips used to make the sandwich. Actually, it can be noticed that the walls 15$d$, 15$e$, 15$f$, 15$g$ and 15$h$ of these elementary channels are not parallel but are closer together at plane EE′ than they are at plane DD′.

The folding of the strip of corrugated sheet $A_1$ and its insertion between the two enveloping sheets 3 and 4 of the sandwich takes place in the following manner:

For the reasons indicated with respect to FIGS. 28–39, the four strips progress, in the present case, at a speed $v$ whereas the enveloping sheets and the finished sandwich advance at a speed $kv$ equal to $v$ cosine $\gamma$. Up to plane DD′, the strips are maintained between the two parallel faces 15$b$ and 15$c$ of the channel. Pushed at a speed $v$ by the marking device, they therefore move in a straight line manner. It is still in this direction that they emerge downstream from DD′ inside the space of increasing height which follows since their own rigidity constrains them to do so.

During the time the strips travel in this space, the folds form themselves regularly and progressively at their surface to the extent that they enter alternately into contact with the inclined faces 15$b$ and 15$c$ of the channel. It cannot be otherwise since the difference in the speeds of advance so require. Indeed, if one considers the last fold formed $a_6b_6$, it will be seen that at the moment it departed from the median direction of the strips to move toward face 15$c$ of the channel, it broke the following fold $c_6d_6$ which had just emerged from plane DD′. Because of this, its formation has provoked the beginning of fold $c_6d_6$ in the direction in which it will continue thereafter to accentuate itself.

FIG. 49 shows what happens when strip $A_1$ of FIG. 47 has advanced one fold length. Just downstream from DD′ in this figure it is future fold $a_7b_7$ whose break has just begun. Fold $c_6d_6$ is already clearly in contact with the upper face 15$b$ of the channel as fold $a_6b_6$ previously was with respect to the lower face 15$c$.

The direction of the break of the last fold $a_7b_7$ induces it to move toward the lower face 15$c$ of the channel just as fold $a_6b_6$ had done before it.

Thus, the folds of each of the strips gradually begin to accentuate themselves and end up at the inside of the two limits formed by the two oblique faces 15$b$ and 15$c$ of the channel (FIG. 47). Near the end EE′ of the channel, where the folded strips emerge, they enter into intimate contact with the two enveloping sheets 3 and 4 of the sandwich which are coated, as in the preceding case (FIGS. 28–39), with the adhesive necessary for bonding the folds. From plane CC′ on, the forming of the sandwich can be considered as finished.

It should be noted that in the plan view of FIG. 48, the limits between which the various strips advance converge, in principle, from the width of these strips developed flat at DD′ down to the naturally narrower projection of the width of the folded strip at CC′. Actually, this reduction in width does not take place as simply as would appear since the folds, in forming themselves progressively, incline themselves from the direction $c_6d_6$ toward the more transverse final direction $a_3b_3$. This increase in inclination imposes a certain twisting of the strips on their various flank surfaces between folds, which has the quite natural effect of chasing the strip (during the course of folding) out of alignment toward one side. In order to allow this tendency complete latitude, it was found desirable to retain only as much of a guide on this side as would seem essential. This is the reason why the separations 15*d*, 15*f* and 15*h* are thick whereas the separations 15*e* and 15*g* are thin.

The process for making sandwich materials which has just been described has the advantage of making it possible to make cores out of inclined adjacent strips composed of folds whose inclinations are opposite to each other in the same manner as this occurs in chevroned structures. Because of this, these cores can be considered as having a resistance, for an equal quantity of corrugated sheet material used, equivalent to chevroned cores with respect to their resistance.

When used in this specification and claims, the reference to material being folded or formed in a "zig-zag manner" or the like shall be construed to refer to the configuration of a vertical section of the material.

What is claimed is:

1. A method of forming a structure of the type having a skin on each side of a core, said core being made of longitudinally ruled sheet material which is transversely folded in a zig-zag manner, the ridges formed by the zig-zag folds being in contact with said skins, said method comprising: providing a pair of spaced skins; providing longitudinally ruled sheet material which contains a plurality of spaced transverse line markings which constitute lines of weakness along which said material will yield to folding and feeding said sheet material into the space between said pair of skins in a direction transverse to said transverse line markings in a manner such that said sheet material is progressively folded along successive ones of said transverse lines with alternate ones of said transverse lines contacting one of said skins and the transverse lines intermediate said alternate ones contacting the other of said skins, so as to form a structure comprising two skins sandwiched about a core, said core being made of a longitudinally ruled material golded in zig-zag form along its lines of contact with said skins, and bonding said ridges to said skins.

2. A method as defined in claim 1 wherein said core material and said skins are moved relative to one another in a direction transverse to said transverse lines; the speed of movement of said skins being equal to the speed of movement of said core material multiplied by the cosine of the acute angle which each of the downstream-inclined portions of said core makes with the skins with which it is in contact.

3. A method as defined in claim 2 wherein said transverse lines are positioned obliquely with respect to the direction of movement of said core material; said core material being fed into the space between said pair of skins at an angle relative to the direction of movement of said skins.

4. A method as defined in claim 3 wherein said last-mentioned angle is approximately equal to the difference between (a) the acute angle formed by said line markings and aline coinciding with the direction along which said core material is fed into said space between said pair of skins, and (b) the acute angle formed by the ridges which are in contact with said skins and a line coinciding with the direction of movement of said skins.

5. A method as defined in claim 3 wherein said core material is caused to be formed into an undulating structure between said skins by applying a force to said core material on the upstream side of the next transverse line which is to be placed in contact with said skins; said force being applied to said core material so as to move it in the direction of the skin with which said next transverse line is to be placed into contact.

6. A method as defined in claim 3 wherein a plurality of strips of core material are simultaneously fed into the space between said skins to form a structure having a plurality of laterally situated core elements.

7. A method as defined in claim 6 wherein the line markings of said strips are positioned obliquely with respect to the direction of movement of said strips and wherein the olique line markings of one of said strips are skewed in an opposite direction from those of a second of said strips and wherein said one strip and said second strip are fed into the space between said pair of skins at an angle and in converging relationship to one another.

8. A method as defined in claim 1 wherein some of the portions of said core material which are upstream of the last transverse line to be placed in contact with said skins are maintained substantially in linear relationship to one another and wherein a plurality of portions of said core material are positioned between the point at which said linear relationship terminates and said last transverse line; said plurality of portions being confined between outer limiting boundaries which diverge in a direction from said point at which said linear relationship terminates toward said last transverse line.

9. A method as defined in claim 8 wherein said skins converge towards one another up to about the point at which said transverse lines of said core material come in contact with said skins, said skins thereafter being in substantial parallelism with one another.

10. A method as defined in claim 8 wherein said linearly related portions are confined in said relationship and are positioned along a line which is substantially coincident with the median plane between said skins; and wherein at the time the upstream ridge line of a given portion leaves the area of linear confinement and enters the area of diverging boundary confinement said upstream transverse line will begin to move towards the outer limiting boundary opposite that towards which the transverse line immediately downstream therefrom has previously moved.

11. A method as defined in claim 10 wherein said transverse lines are positioned obliquely with respect to the direction of movement of said skins.

12. A method as defined in claim 11 wherein said core material moves laterally with respect to the direction of movement of said skins from the point at which said linear relationship terminates to the point at which a given transverse line contacts one of said skins.

13. Apparatus for forming a structure of the type having a skin on each side of a core, said core being made of longitudinally ruled sheet material which is transversely folded in a zig-zag manner, the ridges formed by the zig-zag folds being in contact with said skins, said apparatus comprising: means for moving a pair of skins in spaced relationship to one another and means to feed a longitudinally ruled sheet of core material which contains a plurality of spaced transverse line markings which constitute lines of weakness along which said material will yield to folding into the space between said pair of skins in a direction transverse to said transverse line markings; and means to progressively fold said sheet material while it is being fed into said space along successive ones of said transverse lines so that alternate ones of said transverse lines contact one of said skins and the transverse lines intermediate said alternate ones contact the other of said skins, so as to form a structure comprising two skins sandwiched about a core, said core being made of a longitudinally ruled material folded in zig-zag form along its lines of contact with said skins.

14. Apparatus as defined in claim 13 wherein said core feeding means comprises means to feed said core material into the space between said pair of skins at an angle relative to the direction of movement of said skins.

15. Apparatus as defined in claim 14 wherein said last-mentioned angle is approximately equal to the difference between (a) the acute angle formed by said line markings and a line coinciding with the direction along which said core material is fed into said space between said pair of skins, and (b) the acute angle formed by the ridges which are in contact with said skins and a line coinciding with the direction of movement of said skins.

16. Apparatus as defined in claim 14 wherein said core feeding means comprises means for applying a force to said core material on the upstream side of the next transverse line to be placed in contact with said skins so as to move said core material in the direction of the skin with which said next transverse line is to be placed into contact.

17. Apparatus as defined in claim 14 wherein said core feeding means further comprises means for maintaining portions of said core material which are upstream of the next transverse line to be placed in contact with said skins in a substantially linear relationship to one another while said core material is fed into the space between said pair of skins.

18. Apparatus as defined in claim 14 wherein said core feeding means comprises an elongated channel two of whose walls are adapted to be located on opposite faces of said core material as said material is fed into the space between said pair of skins; said walls sufficiently confining said core material so as to maintain portions of said material which are upstream of the next transverse line to be placed in contact with said skins in a substantially linear relationship; said channel being articulated at a point remote from its end which is closest to said next transverse line so that said end can be moved towards and away from each of said skins.

19. Apparatus as defined in claim 18 wherein said channel is articulated at a point approximately coincident with the median plane between said skins.

20. Apparatus as defined in claim 13 wherein said core feeding means comprises means for maintaining in substantially linear relationship to one another at least some of the portions of said core material which are upstream of the last transverse line to be placed in contact with said skins and for positioning a plurality of portions of said core material between the point at which said linear relationship terminates to the point at which a given means for confinining said plurality of portions between outer limiting boundaries which diverge in a direction from said point at which said linear relationship terminates toward said last transverse line.

21. Apparatus as defined in claim 20 additionally comprising means to permit the lateral movement of said core material with respect to the direction of movement of said skins from the point at which said linea relationship terminates to the point at which a give transverse line contacts one of said skins.

22. Apparatus as defined in claim 13 wherein said co feeding means comprises a channel between whose wal said core material is confined as it is fed into the spa between said skins; a first section of said channel bei adapted to sufficiently confine said core material so to maintain portions of said material in substantial linear relationship to one another; a second section said channel being downstream from said first sectic and having walls diverging from one another in the d rection of feed of said core material; said core feedi means being adapted to feed core material through sa first section, into said second section and into the spa between said skins and into contact therewith.

23. Apparatus as defined in claim 22 wherein mea are provided to maintain said skins in a converging rel tionship up to approximately the downstream end of sa channel and to maintain said skins in substantial para lelism thereafter.

References Cited

UNITED STATES PATENTS

| | | | |
|---|---|---|---|
| 1,519,694 | 12/1924 | Muessman | 161—137 |
| 1,591,062 | 7/1926 | Smith | 156—202 |
| 2,190,490 | 2/1940 | Sendzimir | 161—135 |
| 2,193,052 | 3/1940 | Atwater | 156—2( |
| 2,409,249 | 10/1946 | Brown | 156—205 |
| 2,429,508 | 10/1947 | Belaieff | 161—137 |
| 2,866,075 | 12/1958 | Van Pappelendam | 156—272 |
| 2,963,128 | 12/1960 | Rapp | 161—134 |
| 3,143,194 | 8/1964 | Hart | 189— |
| 2,348,703 | 5/1944 | Weir et al. | 161—137 X |
| 3,037,592 | 6/1962 | Shipley et al. | 52—6 |
| 3,235,432 | 2/1966 | George | 156—2( |

FOREIGN PATENTS

| | | |
|---|---|---|
| 482,749 | 11/1937 | Great Britain. |

ROBERT F. BURNETT, Primary Examiner

W. A. POWELL, Assistant Examiner

U.S. Cl. X.R.

52—618; 156—227, 294, 585; 161—132, 134, 137

UNITED STATES PATENT OFFICE

CERTIFICATE OF CORRECTION

Patent No. 3,461,013 August 12, 1969

Lucien Victor Gewiss

It is certified that error appears in the above identified patent and that said Letters Patent are hereby corrected as shown below:

Column 2, line 18 "adapted" should read -- adopted --. Column 5, line 48, "has" should read -- as --. Column 8, line 30, cancel "and", second occurrence. Column 11, line 39, "golded" should read -- folded --. Column 13, line 39, after "terminates", the remainder of claim 20 should be canceled and the following inserted and said last transverse line; and means for confining said plurality of portions between outer limiting boundaries which diverge in a direction from said point at which said linear relationship terminates toward said last transverse line.---.

Signed and sealed this 12th day of May 1970.

(SEAL)
Attest:

EDWARD M.FLETCHER,JR.
Attesting Officer

WILLIAM E. SCHUYLER, JR.
Commissioner of Patents